United States Patent
Hilborn et al.

(10) Patent No.: US 7,065,171 B1
(45) Date of Patent: Jun. 20, 2006

(54) METHOD FOR SYNCHRONIZATION OF RECEIVED SIGNALS

(75) Inventors: Derek S. Hilborn, Kirkland, WA (US); Louis Leung, Redmond, WA (US); Hongliang Zhang, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 758 days.

(21) Appl. No.: 09/982,952

(22) Filed: Oct. 22, 2001

(51) Int. Cl.
*H04L 7/00* (2006.01)

(52) U.S. Cl. ............... 375/355; 375/143; 375/152; 375/362; 370/503

(58) Field of Classification Search ............ 375/260, 375/271, 303, 334, 350, 355, 363–366, 143, 375/152, 362; 370/203–211, 504, 505, 509, 370/512, 503
See application file for complete search history.

(56) References Cited

U.S. PATENT DOCUMENTS 5,602,835 A * 2/1997 Seki et al. ............... 370/206
5,790,784 A 8/1998 Beale et al. ............ 395/200.01
6,058,101 A * 5/2000 Huang et al. ............ 370/208
6,148,045 A 11/2000 Taura et al. ............ 375/344

FOREIGN PATENT DOCUMENTS

EP 0 884 878 12/1998

* cited by examiner

*Primary Examiner*—Khai Tran
*Assistant Examiner*—Edith Chang
(74) *Attorney, Agent, or Firm*—Kenyon & Kenyon LLP (57) ABSTRACT

A method and apparatus provide efficient synchronization recovery at the receiver end for a digital transmission system. At the receiving end, a digital signal is received including a transmitted data portion and a guard period. A signal envelope for the received digital signal is determined, and the signal envelope is filtered to find the center of the guard period, which provides a time reference for the received digital signal. Embodiments of the present invention described herein may be used for optimal operation of a digital transmission system by efficiently recovering synchronization from a received digital signal during noisy conditions without being dependent on signal shape or requiring complicated threshold calculations.

17 Claims, 7 Drawing Sheets

FIG. 1  PRIOR ART

THE ORTHOGONALITY PRINCIPLE

FIG. 2    PRIOR ART

GUARD PERIOD PRINCIPLE

METHOD FOR SYNCHRONIZATION OF RECEIVED SIGNALS

TECHNICAL FIELD

The present invention relates generally to digital transmission systems. It particularly relates to a method for improving synchronization for a receiver within a digital transmission system that uses orthogonal frequency division multiplexing.

BACKGROUND OF THE INVENTION

The growing popularity of digital multimedia applications (e.g., short message service, internet, WebTV, etc.) has created an ever increasing demand for digital broadband communication systems. Consequently, more and more user data is transmitted over limited frequency bands to increase system throughput and capacity using various transmission techniques. However, these broadband transmission techniques are very sensitive to transmission impairments such as noise, adjacent channel interference, inter-symbol interference, multipath effects, and other impairments.

Growing more popular recently (especially in the United States), orthogonal frequency division multiplexing (OFDM) has been used to help solve these negative effects from multiple user digital broadband transmission. OFDM, chosen as the transmission method for European radio (DAB—Digital Audio Broadcasting) and TV (DVB-T—Digital Video Broadcasting) standards, is a multicarrier transmission technique that divides the available spectrum into many carriers, each one being modulated by a low rate data stream. Similar to Frequency Division Multiple Access (FDMA), OFDM achieves multiple user access by subdividing the available bandwidth into multiple narrowband channels that are allocated to users.

Figure 1:
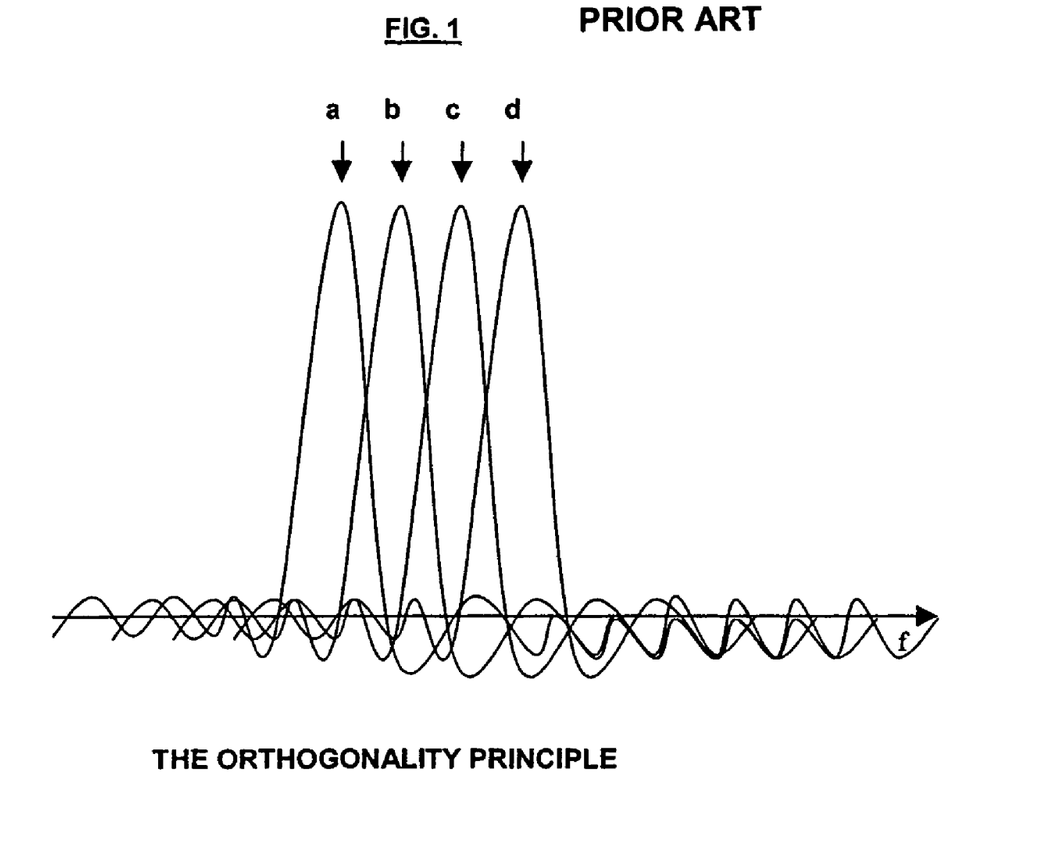
FIG. 1 is a diagram of an exemplary OFDM frequency spectrum.
Figure 2:
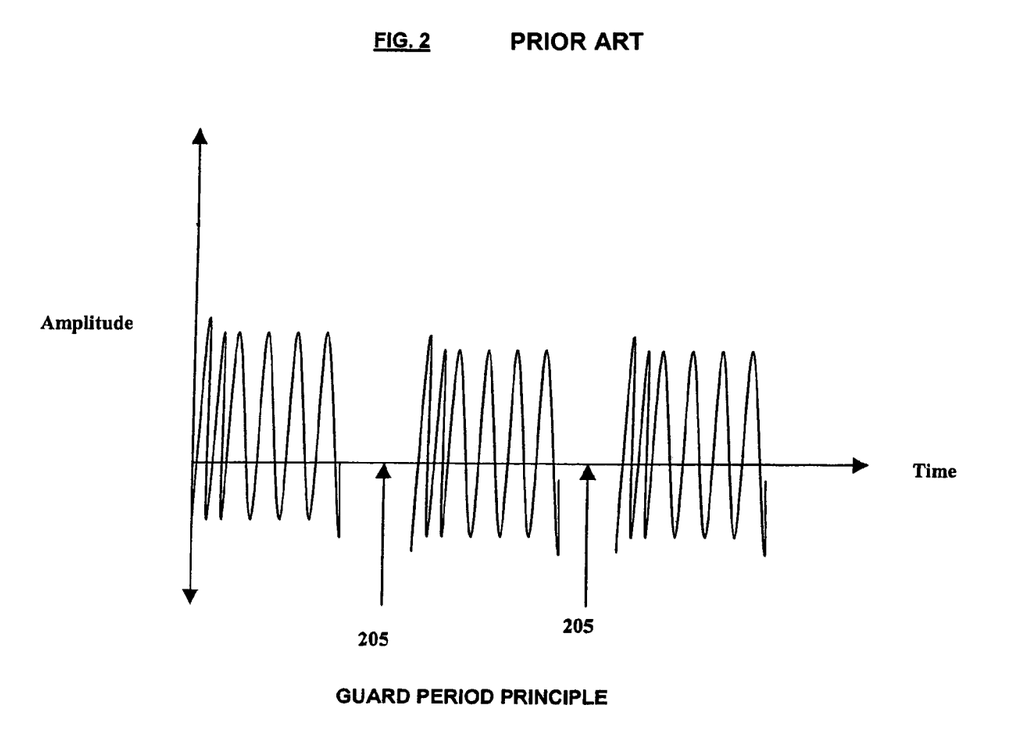
FIG. 2 is a diagram of an exemplary OFDM time-domain signal.

However, OFDM uses the spectrum more efficiently by spacing the channels much closer together (actually overlapping). This close spacing of user channels is achieved by making all the carriers orthogonal to one another which prevents interference between the closely spaced carriers. This orthogonal relationship is created (using an IFFT—Inverse Fast Fourier Transform) by each carrier having an integer number of cycles over a symbol period. As shown in FIG. 1, due to this periodicity, the spectrum of each carrier (a, b, c, d) has a null at the center frequency of each of the other carriers in the system resulting in no interference between carriers, and allowing the carriers to be as closely spaced as theoretically possible. At the receiving end, each carrier (or subcarrier) may be evaluated at a particular frequency (or time period) and all other carrier signals should be zero (eliminating adjacent carrier interference). Additionally, as shown in FIG. 2, to help combat multipath effects a guard period 205 is added between transmitted symbols (information transmitted over the carriers) which is most commonly a combination of a cyclic extension of the symbol and a zero amplitude signal (no-signal period).

Figure 3:
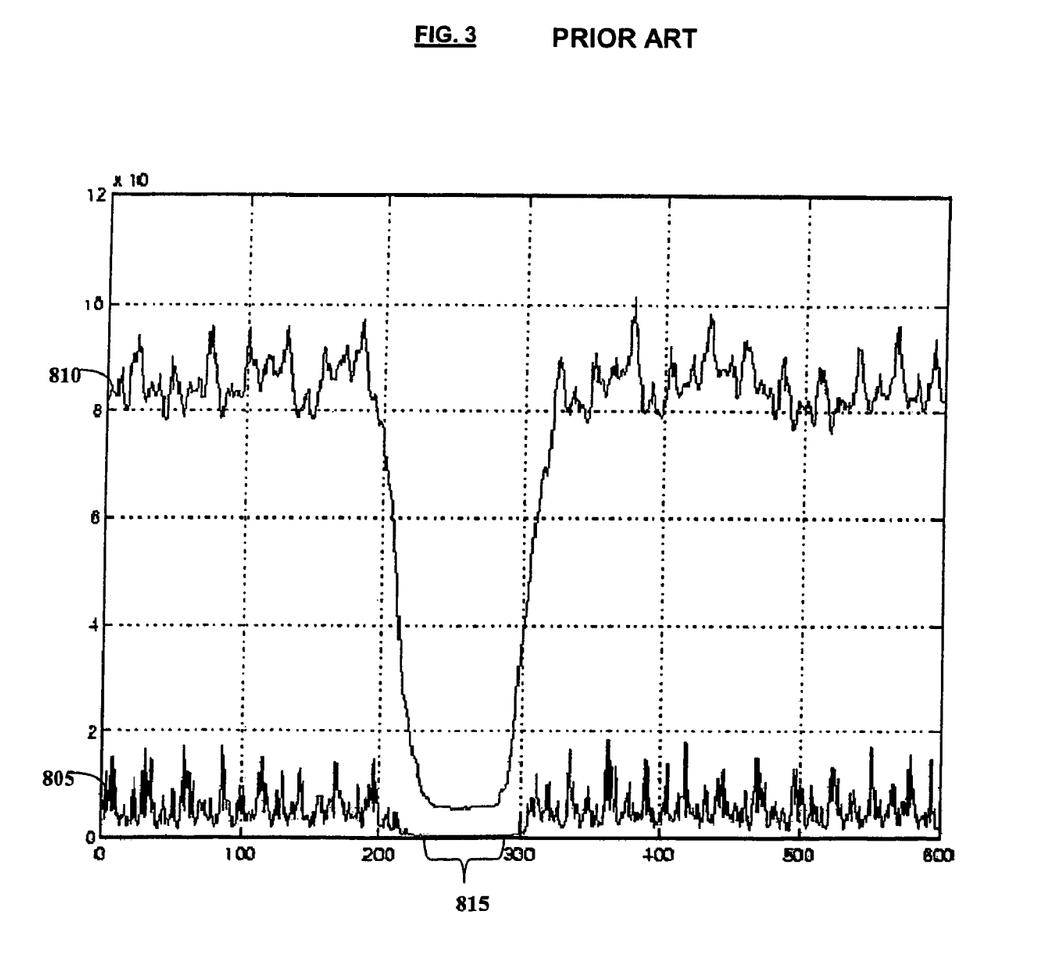
FIG. 3 is a diagram of an OFDM time-domain signal before and after filtering.

A key factor in preserving the orthogonal relationship between carriers is synchronization (operating on same modulation frequency and time-scale) between transmitter and receiver. Commonly, synchronization is maintained (recovered) at the receiver end by detecting this no-signal (null) period of the transmitted OFDM signal by comparing the power (energy) of a received OFDM signal with multiple pre-determined threshold levels. The pre-processed signal 805 and processed (filtered) signal 810, including null period detection 815, are shown in FIG. 3.

Commonly, in practicing this technique, detected maximum and minimum signal levels are set as thresholds and then negatively and positively adjusted, respectively, to find the exact point (ramp-up period for a timing reference) for the start of the transmitted data frame (portion) following the guard period 815. For example, with reference to FIG. 3, a first maximum level (threshold) of 10 may be found at time 380, and a first minimum level (threshold) of 0.5 may be found at time 255 for filtered signal 810. Thereafter, the maximum level threshold may be repeatedly reduced (e.g., initially by 50%) and the minimum level threshold may be repeatedly increased (e.g., initially by 25%) to find this exact starting point for the transmitted data frame to recover time synchronization. U.S. Pat. No. 6,246,735, the disclosure of which is incorporated by reference herein, provides further description of detecting the end of the null period using successive calculation of power (energy) thresholds. However, this threshold-adjustment technique requires complicated calibration of multiple thresholds and calculation of power (energy) levels making it susceptible to noise and very sensitive to the shape of the no-signal period.

Therefore, due to the disadvantages of current synchronization approaches, there is a need to provide a synchronization method that efficiently recovers a timing reference (e.g., no-signal period) from the received OFDM signal in the presence of noisy conditions, and does not depend on the shape of the no-signal period nor require complicated calibration of multiple energy level thresholds.

SUMMARY OF THE INVENTION

The present invention is directed to an efficient method for recovering synchronization at the receiver end for a digital transmission system. At the receiving end, a digital signal is received including a transmitted data portion and a guard period. A signal envelope for the received digital signal is determined, and the signal envelope is filtered to find the center of the guard period, which provides a time reference for the received digital signal. Embodiments of the present invention described herein may be used for optimal operation of a digital transmission system by efficiently recovering synchronization from a received digital signal during noisy conditions without being dependent on signal shape or requiring complicated threshold calculations.

DETAILED DESCRIPTION

Figure 4:
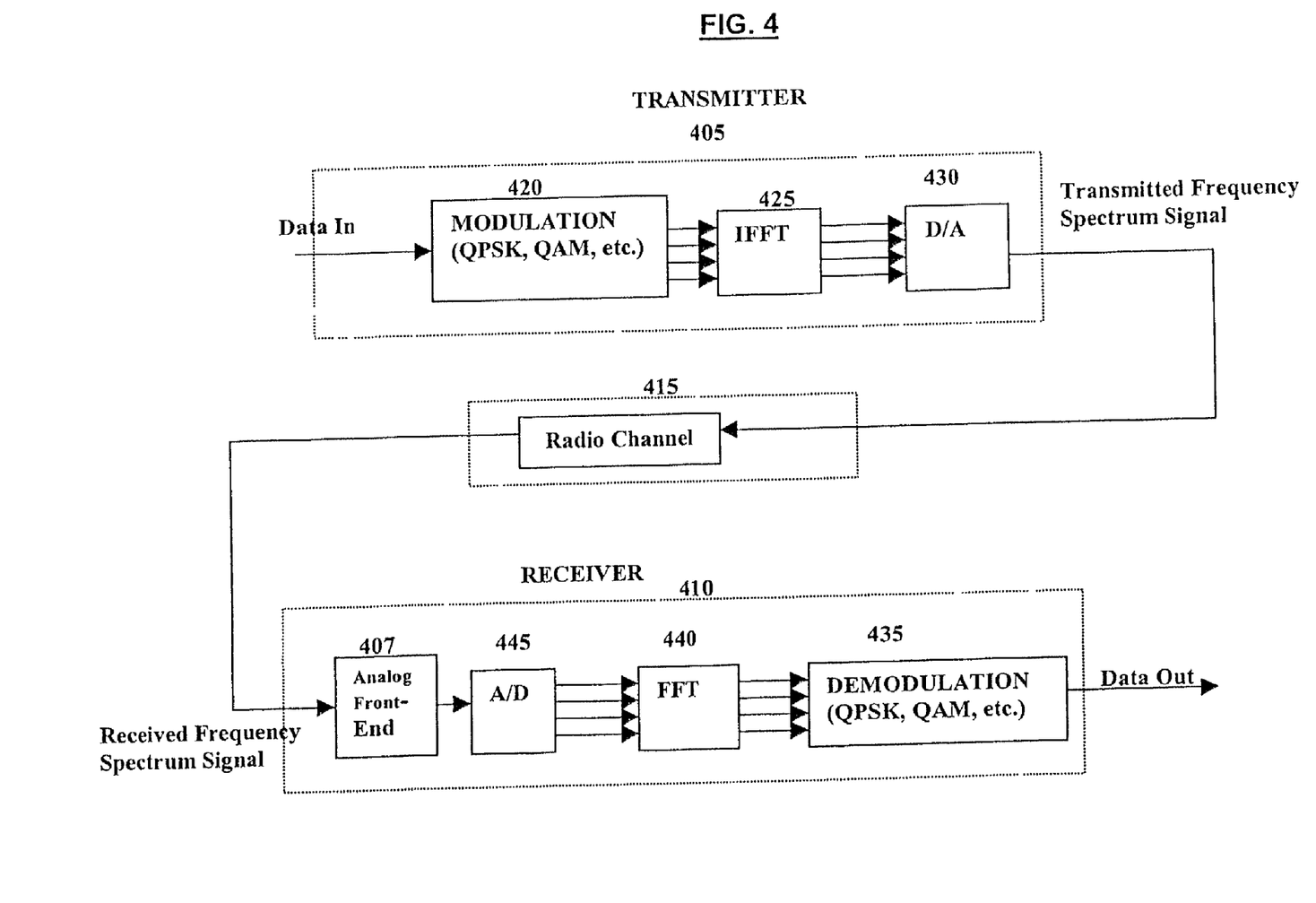
FIG. 4 is a block diagram of an exemplary digital transmission system in accordance with embodiments of the present invention.

FIG. 4 shows an exemplary digital transmission system 400 using orthogonal frequency division multiplexing (OFDM). Transmission system 400 includes transmitter 405, receiver 410, and radio channel 415. During operation, an OFDM transmission signal is generated by inputting user data into modulator 420 for modulation with a pre-determined carrier frequency using a modulation scheme (e.g., QPSK, QAM, etc.) corresponding to pre-determined amplitude and phase requirements of the carrier. The frequency signal (carrying the data) is then converted back to a time-domain signal using Inverse Fast Fourier Transform 425 that also ensures orthogonality of each carrier. The time-domain signal is then carried onto an RF carrier, via D/A (digital-to-analog) converter 430, for transmission to receiver 410 via radio channel 415. Transmitter 405 may further include a frequency converter to change the frequency of the RF carrier for transmission.

Transmitter 405 may further include a serial-to-parallel converter (not shown), located before the modulator 420, that receives the input user data (in a serial data stream) and converts/formats the input user data into a pre-determined word size for transmission (e.g., 2 bits/word for QPSK), and shifts the user data into a parallel format. The user data is then transmitted in parallel by assigning each data word to one carrier (channel) in the transmission. Also, prior to actual transmission, a parallel-to-serial converter (not shown), located after the IFFT 425, may be inserted to convert the plurality of data streams into one signal waveform for transmission. Additionally, transmitter 405 may further include a guard interval insertion unit (not shown), located after the parallel-to-serial converter, that inserts a guard period (no-signal period) at the start of each symbol transmitted by the carriers. Additionally, receiver 410 may include a guard period removal unit and serial-to-parallel converter (both not shown) to perform the reverse process.

Typically, radio channel 415 may add an assortment of negative effects to the transmitted signal including noise, multipath effects, and signal attenuation (power clipping). The transmitted signal is received at analog front-end 407 that may include or be followed by a down-converter to convert the received RF carrier signal to a lower frequency. Thereafter, an A/D (analog-to-digital) converter 445 converts the received analog RF carrier signal back to a digital form. Then, a Fast Fourier Transform 440 is applied to convert the digital signal back to the frequency domain, and a demodulator 435 is used to extract the input user data signal.

Figure 5:
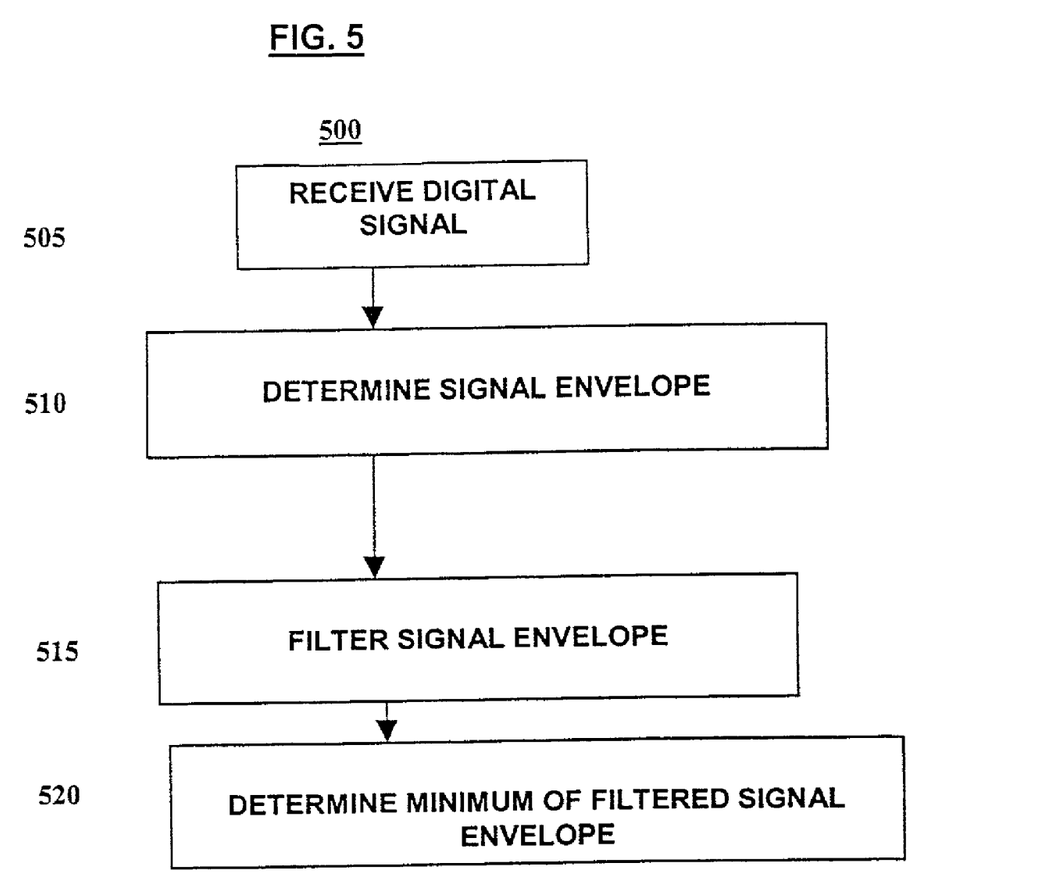
FIG. 5 is a flow process diagram showing the process followed for synchronization recovery in accordance with embodiments of the present invention.

FIG. 5 illustrates a flow process diagram 500 that shows the process followed for synchronization recovery in accordance with embodiments of the present invention. These steps are followed at the receiving end (e.g., receiver) of a digital transmission system. At step 505, a transmitted digital signal (from a transmitter) is received. Prior to corruption by the channel, the digital signal was a time-domain signal carrying transmitted data (e.g., user data) and a guard (null) period (or band) during which no signal is transmitted. The transmitted data and guard period may be carried in a time slot for a time-division multiplexed access (TDMA) transmission system. The guard period may constitute a gap between transmitted data periods for the digital signal.

At step 510, a signal envelope for the received digital signal is determined based on sampling the transmitted data and guard period, both transmitted during one period of the digital signal, over a plurality of time slots. The receiver may use a pre-determined time slot duration (period) from the transmitter as an initial timing reference to help produce the signal envelope. The power (energy) of the sampled signal period may be calculated and averaged over the plurality of time slots. For example, the received digital signal may be repeatedly sampled (e.g., 1200 samples) over one period of the digital signal (e.g., 375 microseconds) where the signal period includes a guard band (period—e.g., 50 microseconds) and the magnitude of each sample is stored in a buffer. The sampling process may be repeated a plurality (e.g., 10–12) of times where the resulting sample magnitudes are averaged over the process to generate the signal envelope.

At step 515, the signal envelope may be filtered. The filter may be a matched filter that is matched to the guard period (gap). For example, a rectangular filter (impulse response is rectangular), approximating a matched filter for a substantially rectangular-shaped gap and having a length (time period) approximately (roughly) equal to the length of the guard period of the digital signal, may be employed to generate a filtered signal. The filtered signal may be used as a basis for resolving synchronization timing references for the receiver.

At step 520, the minimum level (e.g., power level) of the filtered signal envelope is determined that indicates the center of the null (gap) period. This minimum provides a time reference for the received digital signal. Thereafter, the timing of a receiver in a digital transmission system may be adjusted to correspond to the transmitter timing in order to find the beginning of a transmitted data frame.

Figure 6:
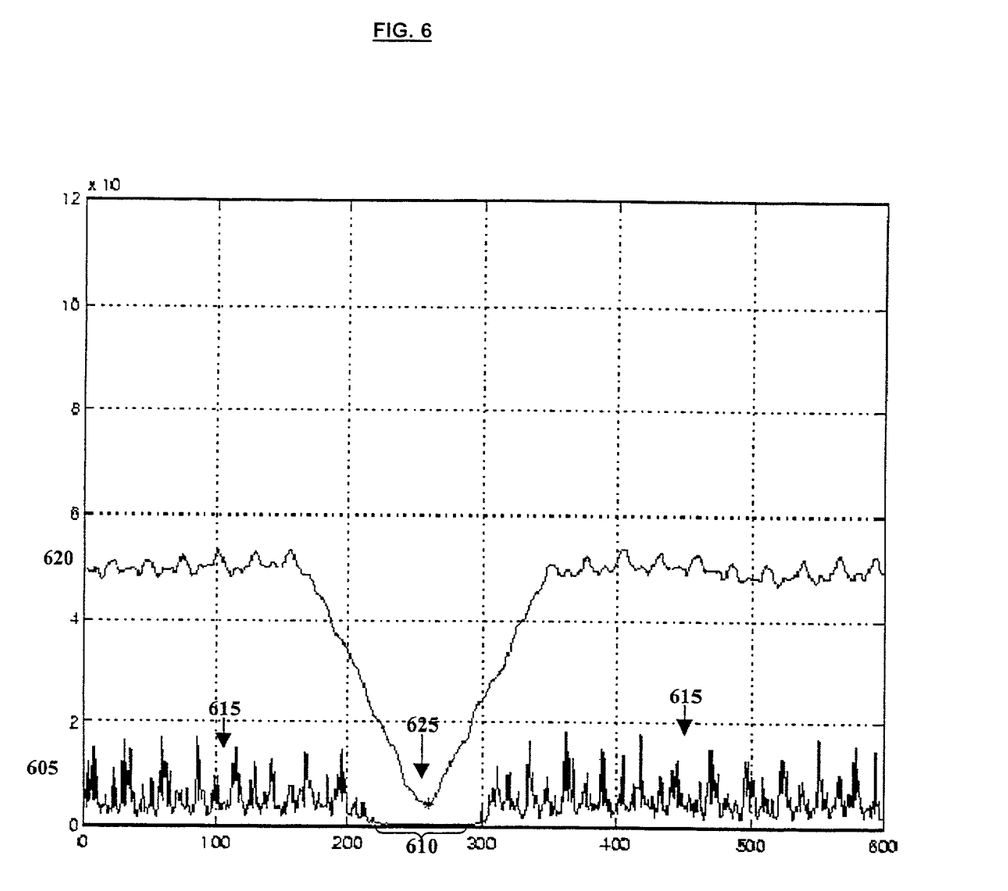
FIG. 6 is a diagram of a digital time-domain signal before and after filtering in accordance with embodiments of the present invention.

FIG. 6 illustrates a diagram 600 of a time-domain digital signal before and after filtering in accordance with embodiments of the present invention. As shown in FIG. 6, the pre-filtered digital signal 605 includes a guard period 610 and transmitted data portions 615 comprising a plurality of time slots. After the process of FIG. 5 is performed on digital signal 605, the filter outputs a filtered digital signal envelope 620. Signal envelope 620 includes a gap (null) portion with a minimum (power) level 625. Minimum power level 625 indicates the center of the null period and the gap edge (start of the transmitted data portion) can be determined by offsetting by one-half of the gap width. Therefore, after finding the gap center, the beginning of a transmitted data frame (finding of a slot sync signal) can be determined by moving, from the gap center, one-half of the gap width to the start of a transmitted data period. The gap width of the guard period may be pre-determined from the transmitter. For example, the minimum level of the guard period (gap center) may be found at time 255 in FIG. 6. Adding a time offset of 45 moves the receiver to the start of a transmitted data frame (portion) at time 300 as shown for received digital signal 605 in FIG. 6. The receiver may be slot (time) synchronized after determining the gap center to provide a time reference for the received digital signal. Also, the rectangular filter may be a moving average filter whose span is roughly the width of the gap. A moving average filter allows for an average to be continuously calculated as samples are gathered from one time slot to the next without having to wait for complete sampling of the succeeding time slot. For example, if 100 samples were taken of a first time slot and an average calculated, the first sample of the succeeding time slot could be added (while subtracting the first sample—earliest sample taken—of the previous time slot) to continue a 100-sample average without having to wait for the next 100 samples to be taken. The time-span of the filter is approximately the same time-span (period) of the guard band.

Additionally, filtering the received signal 605 (as performed in accordance with the process of FIG. 5) may result in a timing delay (time offset from received signal 605) for signal 620. This timing delay may be immediately corrected by a receiver before further processing, or can be factored in when calculating the time offset to move from the gap center 625 to the start of a transmitted data frame.

Figure 7:
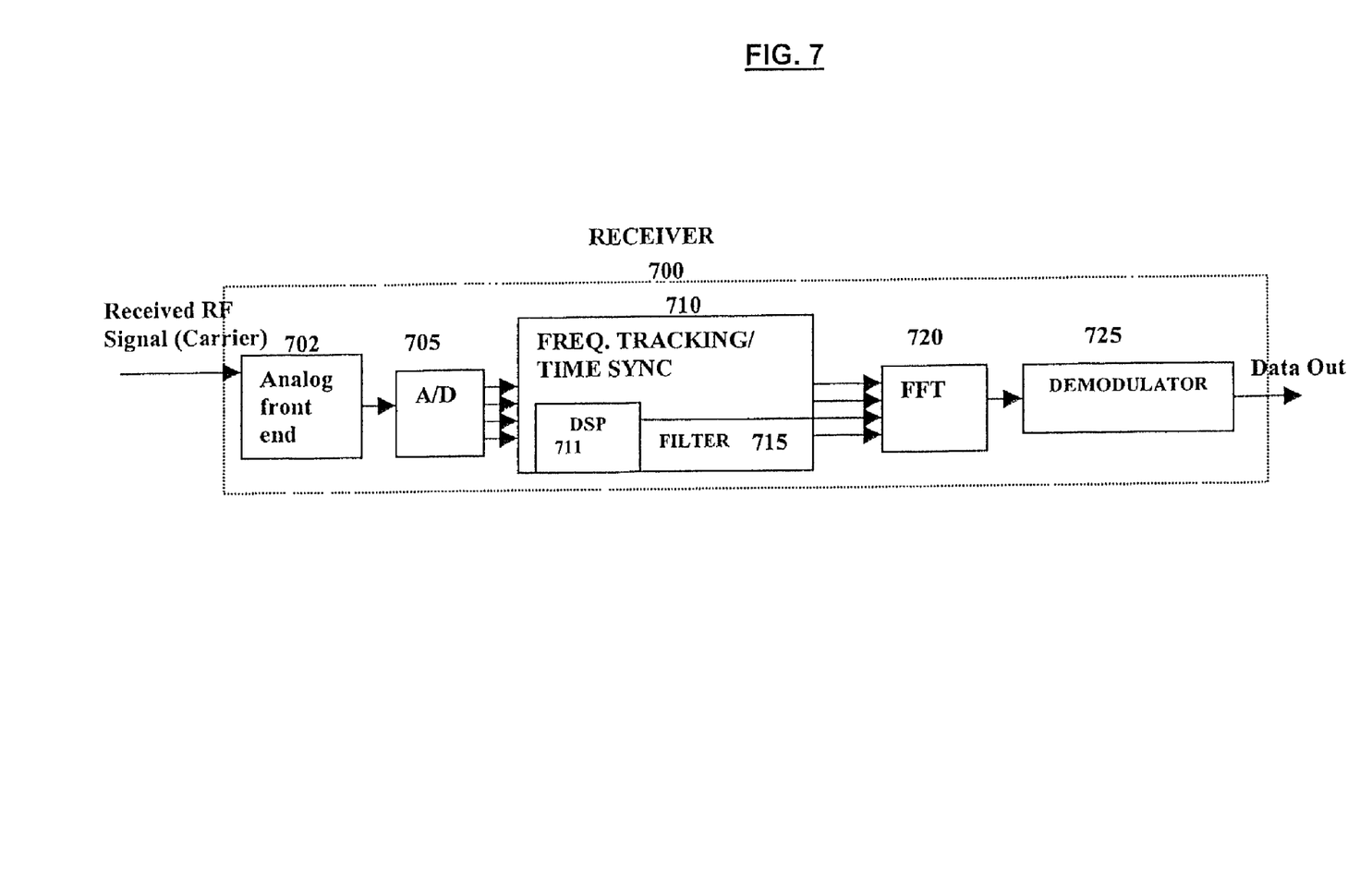
FIG. 7 is a block diagram of a receiver in accordance with embodiments of the present invention.

FIG. 7 illustrates a block diagram of a receiver 700 in accordance with embodiments of the present invention that may perform the process of FIG. 5. An analog front-end 702 and an A/D converter 705 may perform step 505 by receiving the analog RF carrier (from a transmitter) and converting the RF signal to a digital form. Also, analog front-end may include or be followed by a downconverter to convert the received RF carrier signal to a lower frequency prior to digital conversion by A/D 705. Following the digital conversion, a frequency tracking/time synchronization unit 710, receiving the converted signal from converter 705, may perform step 510 by determining the signal envelope for the received digital signal based on sampling the transmitted data periods and guard (null) periods over a plurality of time slots. A filter 715, included within unit 710, may perform step 515 by filtering the signal envelope using a rectangular filter (impulse response is rectangular) whose time span is roughly the length of the null period. Then, unit 710 performs the step of 520 by determining the minimum level of the filtered signal envelope which indicates the center of the null period, and provides a time reference for the received digital signal. The receiver 700 has then achieved both timing and frequency synchronization recovery for the transmitted data frame. Frequency tracking performed by unit 710 may be implemented in software and use a feedback control network to adjust the frequency of a receiver oscillator to match the transmitted frequency of the received signal from the transmitter. As illustrated in FIG. 7, time synchronization performed by unit 710 may be implemented using a programmable digital signal processor (DSP) 713, field-programmable gate array (FPGA), microcontroller, or some other type of programmable controller device to perform steps 510–520 as shown in FIG. 5 to provide a time reference (e.g., detection of the guard period) for the received digital signal.

Thereafter, an FFT 720 and Demodulator 725 follow the unit 710 to convert the time-domain digital signal to the frequency domain, and a demodulator 435 is used to extract an input user data signal originally transmitted (carried) by the digital signal. A transmitter may be used to transmit the digital signal, via an RF carrier, to receiver 700 to produce an end-to-end digital transmission system wherein the receiver 700 performs processing steps in accordance with the steps described in FIG. 5 to recover synchronization.

Embodiments of the present invention may be used for a plurality of applications. The processing steps and digital transmission system described herein may be applied to DVB/DAB applications, wireless/cellular applications, and allow synchronization recovery for weaker signals (below a pre-determined threshold for regular service). Particularly, for wireless/cellular applications, embodiments of the present invention shown in FIGS. 5–7 may be used by the receiver of a remote wireless unit. The remote wireless unit may include, but is not limited to, hand-held or other wireless phones, laptops, personal digital assistants (PDAs), pagers, and other remote wireless units that may be used by a user for communicating within a wireless communications system.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

What is claimed is:

1. A method for attaining synchronization in a digital transmission system, comprising:
  receiving a digital signal carrying transmitted data and a guard period during which no signal is transmitted;
  determining a signal envelope for the received digital signal;
  filtering the signal envelope using a matched filter having a span corresponding to the guard period; and
  determining the guard period from the filtered signal envelope to provide a time reference for the received digital signal;
  wherein said step of determining the guard period includes determining the minimum level of the filtered signal envelope to indicate the center of the guard period.

2. The method of claim 1 wherein said step of determining a signal envelope includes sampling the transmitted data and the guard period.

3. The method of claim 1, said matched filter having a length approximately equal to a pre-determined length for the guard period of the received digital signal.

4. The method of claim 1, wherein the digital transmission system uses orthogonal frequency division multiplexing for transmission.

5. The method of claim 4, wherein the digital transmission system is a wireless communications system and said method is performed by a remote wireless unit.

6. The method of claim 1, wherein said digital signal is received at a signal level weaker than a pre-determined threshold for regular communications service within the digital transmission system.

7. The method of claim 1, wherein the digital transmission system is one of a digital audio broadcasting system or a digital video broadcasting system.

8. An apparatus for attaining synchronization in a digital transmission system, comprising:
  a controller programmable to perform the steps of:
    determining a signal envelope for a received digital signal, the received digital signal carrying transmitted data and a guard period during which no signal is transmitted;
    filtering the signal envelope using a matched filter having a span corresponding to the guard period; and
    determining the guard period from the filtered signal envelope to provide a time reference for the received digital signal;
    wherein said step of determining the guard period includes determining the minimum level of the filtered signal envelope to indicate the center of the guard period.

9. The apparatus of claim 8, wherein said step of determining a signal envelope includes sampling the transmitted data and the guard period.

10. The apparatus of claim 8, said matched filter having a length approximately equal to a predetermined length for the guard period of the received digital signal.

11. The apparatus of claim 8, wherein the digital transmission system uses orthogonal frequency division multiplexing for transmission.

12. The apparatus of claim 11, wherein the digital transmission system is a wireless communications system and said steps are performed by a remote wireless unit.

13. A digital transmission system, comprising:
a transmitter for transmitting a digital signal carrying user data using an RF carrier;
a receiver to receive the digital signal including:
a controller programmable to perform the steps of:
determining a signal envelope for a received digital signal, the received digital signal carrying transmitted data and a guard period during which no signal is transmitted;
determining a signal envelope for the received digital signal;
filtering the signal envelope using a matched filter matched to the guard period; and
determining the guard period from the filtered signal envelope to provide a time reference for the received digital signal;
wherein said step of determining the guard period includes determining the minimum level of the filtered signal envelope to indicate the center of the guard period.

14. The system of claim 13, wherein said step of determining a signal envelope includes sampling the transmitted data and the guard period.

15. The system of claim 13, said matched filter having a length approximately equal to a pre-determined length for the guard period of the received digital signal.

16. The system of claim 13, wherein the digital transmission system uses orthogonal frequency division multiplexing for transmission.

17. The system of claim 16, wherein the digital transmission system is a wireless communications system and said steps are performed by a remote wireless unit.

* * * * *